United States Patent [19]

Busch et al.

[11] Patent Number: 5,024,783

[45] Date of Patent: Jun. 18, 1991

[54] BOILER AND BOILER WATER TREATMENT SYSTEM

[75] Inventors: Bruce D. Busch, Shakopee; Jeffrey R. Nicholls, Prior Lake, both of Minn.

[73] Assignee: Fremont Industries, Inc., Shakopee, Minn.

[21] Appl. No.: 611,779

[22] Filed: Nov. 13, 1990

Related U.S. Application Data

[63] Continuation-in-part of Ser. No. 420,117, Oct. 10, 1989.

[51] Int. Cl.[5] ............................................. C02F 5/10
[52] U.S. Cl. ................................. 252/180; 252/181; 252/80; 252/82
[58] Field of Search ................... 252/180, 181, 80, 82, 252/86, 87

[56] References Cited

U.S. PATENT DOCUMENTS

| | | | |
|---|---|---|---|
| 4,277,359 | 7/1981 | Lipinski | 252/181 |
| 4,279,768 | 7/1981 | Busch | 252/180 |
| 4,443,340 | 4/1984 | May et al. | 252/181 |
| 4,512,552 | 4/1985 | Katayama et al. | 252/181 |
| 4,545,920 | 10/1985 | Lorenc et al. | 252/180 |
| 4,575,425 | 3/1986 | Boffardi et al. | 252/180 |
| 4,600,524 | 7/1986 | Cusia et al. | 252/181 |
| 4,640,793 | 2/1987 | Persinski et al. | 252/82 |

*Primary Examiner*—Prince E. Willis
*Assistant Examiner*—J. Silbermann
*Attorney, Agent, or Firm*—Haugen and Nikolai

[57] ABSTRACT

An in-service formulation for the removal of scale deposits from metallic working surfaces of boilers and for the ongoing prevention of build-up of such deposits on boiler surfaces, with such deposits commonly consisting of insoluble salts of calcium together with oxides of iron. The formulation comprises a blend of selected phosphonates, sodium lignosulfonate, one or more scale-modifying polymers, along with one or more chelants. Sodium gluconate is utilized for its ability to inhibit corrosion of ferrous surfaces. The pH of the working solution is adjusted to a level of between about 10.5 to 12.5. The formulation of the present invention provides a significant capacity for the removal of scale while remaining fully compatible with the water present in the system during and after scale removal, and the materials remain effective with contaminants present in the boiler water following a substantial number of cycles of concentration.

1 Claim, No Drawings

BOILER AND BOILER WATER TREATMENT SYSTEM

CROSS-REFERENCE TO RELATED APPLICATION

This is a continuation-in-part of our copending application Ser. No. 07/420,117, filed Oct. 10, 1989, entitled "BOILER AND BOILER WATER TREATMENT SYSTEM".

BACKGROUND OF THE INVENTION

The present invention relates generally to improved formulations for the in-service treatment and maintenance of boilers, and more specifically to such a formulation which may be utilized to both restore boiler performance through removal of scale on an in-service basis, while at the same time being designed to maintain the system in proper condition through subsequent prevention or substantial elimination of build-up or redeposition of additional scale. The present invention is an improvement over that disclosed and claimed in the prior U.S. Pat. No. 4,279,768, of Bruce D. Busch, granted July 21, 1981, entitled "SERVICE DESCALER FOR AQUEOUS SYSTEMS", and assigned to the same assignee as the present invention.

In the operation of boiler systems and installations, quantities of water as required are introduced, heated, and utilized at a rate dependent upon the service requirements of the installation. As introduced, make-up water universally contains a quantity of impurities and/or contaminants which, unless treated, contribute to a constant build-up of scale on the heat transfer surfaces or working surfaces of the boiler. These contaminants and/or impurities are normally those same elements or compounds which commonly contribute to water hardness, specifically certain calcium salts along with certain quantities of iron oxides. As has been recognized in the past, scale build-up on heat transfer surfaces in the aforementioned equipment causes ongoing expense to the owner as well as possible exposure to dangerous conditions for those persons located near such equipment. Scale build-up increases thermal impedance and thus decreases the rate of heat transfer through the surfaces. This contributes to an overall loss of efficiency of the system as well as increased energy costs. Scaled heat transfer surfaces are susceptible to corrosion beneath the scaled area since corrosion control agents are unable to effectively contact the metal surfaces. Furthermore, scale acts as an insulative barrier, resulting in inefficient heat transfer. This condition leads to both increased fuel costs and decreased system efficiency. System component failures can occur due to the higher than normal temperatures being required at the heat transfer surfaces in order to maintain normal operation and/or operation requiring extraordinary performance. Thus, clean scale-free heat transfer surfaces represent a desirable condition in boilers and boiler systems.

In the prior U.S. Pat. No. 4,279,768 mentioned above, an in-service descaler is disclosed containing a number of the components present in the present formulation. The present invention constitutes an optimization of those disclosed in U.S. Pat. No. 4,279,768, and furthermore incorporates other components which contribute to the effectiveness of the present formulation for both in-service scale removal and in-service boiler maintenance. The primary components of most water impurity-based scales in the equipment mentioned above are calcium salts (e.g. calcium carbonate, calcium orthophosphate, calcium sulfate and calcium bicarbonate) as well as iron oxides. These compounds are present in most domestic and commercial water supplies, having been found both in surface and subterranean water sources.

The presently commercially available and widely utilized boiler scale prevention includes formulations utilizing chelants, polymeric conditioners and certain gluconates as sequestering agents. Chelants such as tetrasodium ethylene diamine tetraacetic acid (EDTA) and trisodium nitrilotriacetate (NTA) are used to stoichiometrically sequester calcium and iron ions. Stoichiometric treatments require significant concentrations to prevent scale formation, particularly when the water source contains substantial quantities of calcium and iron ions. Gluconates and polyelectrolytes are normally threshold treatments. Threshold treatments are generally effective in controlling large numbers of ions per unit of treatment, and the economy of using such threshold treatments is readily apparent Specific modified formulations in use today are disclosed in U.S. Pat. No. 4,279,768.

In addition to the formulations of U.S. Pat. No. 4,279,768, scale removal has been accomplished by descaling the heat transfer surfaces of boilers with acid treatments. Organic acids such as citric and sulfamic or mineral acids such as hydrochloric are frequently used to remove scale of the type mentioned above. However, in acid descaling, the system must be shut down, drained, acid cleaned, rinsed, drained for a second time and retreated. Acid descaling thus requires either waiting for a convenient time to shut down operations or possibly interrupting production schedules on an emergency basis to achieve cleaning. Either alternative is known to be costly, since draining of the system is often required, and an added cost is the replenishing of chemical treatment once the system is clean.

SUMMARY OF THE INVENTION

The purpose of the present invention is to provide formulations which are capable of in-service use for scale removal as well as for prevention of deposition of additional scale. The descaling and surface maintenance procedures may be accomplished by the formulation of the present invention while the system remains in operation. No system shut-down or draining operations are necessary when using the formulation of the present invention. The formulation dissolves and chelates calcium scales and iron oxides from scale which may have already been formed on the heat transfer surfaces of the system while the system remains in operation. In other words, these dissolved calcium scales and iron oxides are maintained in solution while normal boiler operation is permitted to continue. The operation accordingly is achieved in an economic fashion.

The formulations of the present invention are accordingly designed to perform the following:

1. Remove scale deposits from boiler systems while the systems remain on-line;

2. Offer an increased capability to prevent redeposition of the removed scale; and 3. Permit boiler systems to be run at greater cycles of concentration without encountering redeposition of scale solids. This combination of features permits ongoing operation of systems without requiring shut-down, while continuing to maintain system performance and thus results in fuel/energy, water costs and chemical cost savings.

The present invention is a synergistic blend of a number of functional components, including scale-preventing, modifying and conditioning components, a chelant, and ferrous metal corrosion inhibitors, and an alkaline component to provide the proper pH.

The scale-preventing, modifying and conditioning ingredients include one or more phosphonates selected from the group consisting of 1-hydroxyethane-1,1-diphosphonic acid (HEDP), aminotris methylene phosphonic acid (AMP), and 2-phosphonobutane-1,2,4-tricarboxylic acid (PBTC). Additionally, sodium lignosulfonate is employed for its scale-preventing and other related properties. Also, one or more scale-modifying polymers are utilized, with these polymers being selected from the group consisting of phosphinocarboxylic acid derivatives, polymaleic acid derivatives, polyacrylic acid derivatives, and sulfonated-styrene/maleic acid compounds. These polymers are commercially available. An anionic organic polyelectrolyte is selected, with this polymer component preferably being a polyacrylate, and having a molecular weight in the range of between about 2000 and 6000. This material inhibits the formation of crystal lattice structures of scale components, and hence is effective as a scale-modifying polymer.

The chelant or chelants utilized are preferably selected from the group consisting of tetrasodium salt of ethylene diamine tetraacetic acid (tetrasodium EDTA) or trisodium nitrilotriacetate (trisodium NTA). The EDTA and NTA chelants are selected because of their high efficiency in the formulation, particularly in combination with the other components, as well as their commercial availability and low cost.

In order to provide an inhibitor for ferrous metals, sodium gluconate is selected, with this material being desirable because it also offers, in the overall solution, a scale-removing synergistic enhancement. Sodium gluconate is incorporated primarily because of its sequestering properties and its inhibition of corrosion of ferrous metal surfaces.

In order to achieve appropriate alkalinity, sodium hydroxide or other suitable alkaline component is added until the pH reaches the desirable range of between 10.5 and 12.5. Potassium hydroxide may be a suitable alternate to sodium hydroxide. Generally, a range of between about 200 ppm and 400 ppm of sodium hydroxide in the boiler is appropriate to achieve the proper desired pH.

Therefore, it is a primary object of the present invention to provide an improved in-service descaler and boiler maintenance formulation which has been found highly effective for treatment of boiler installations and systems.

It is a further object of the present invention to provide an improved formulation for the removal of scale from heat transfer surfaces of boilers, and for the ongoing maintenance of these surfaces while the systems are maintained in continuous operation.

It is yet a further object of the present invention to provide an improved formulation for both scale removal and continued treatment of boiler surfaces while the system remains on-line.

It is yet a further object of the present invention to provide an in-service descaler and boiler maintenance product wherein the formulation provides for protection of both ferrous and non-ferrous metal surfaces from attack and/or corrosion.

Other and further objects of the present invention will become apparent to those skilled in the art upon a study of the following specification and appended claims.

DESCRIPTION OF THE PREFERRED EMBODIMENT

In order to best disclose the properties of the preferred embodiment, the following specific formulation is provided:

| Ingredient | Percent by Weight |
| --- | --- |
| 1-hydroxyethane-1,1-diphosphonic acid (HEDP) phosphonate) (60% solution) | 10.00% |
| polyacrylate polymer (50% solution) having a molecular weight of approximately 5100 (available commercially under the trade name "Good-Rite K-732" from B. F. Goodrich Company) | 10.00% |
| sodium lignosulfonate | 2.00% |
| sodium salt of poly(acrylic acid co-hypophosphite) (35% aqueous solution) having a molecular weight of between 200 and 1500, available commercially under the trade name "Belclene 500" from Ciba-Geigy Corp. of Ardsley, NY | 2.00% |
| tetrasodium salt of ethylene diamine tetraacetic acid (40% aqueous solution) (Na4 EDTA) | 10.00% |
| sodium gluconate | 1.00% |
| sodium hydroxide (50% aqueous solution) | 15.00% |
| water | balance. |

The above formulation has been found to be effective at scale removal and prevention in boiler systems when present in the boiler water at concentration ranges between about 20 and 100 ppm.

In order to provide a selection basis for formulations capable of achieving both an initial descaling operation as well as a boiler maintenance material, a number of comparative tests were undertaken. These tests are outlined hereinbelow:

TEST PROCEDURE

Testing the scale removing capacity of the formulation of the present invention was undertaken by assembling a laboratory test rig. The test rig held constant temperature, flow rate and water volume. The test rig monitored and recorded conductivity values of the test solutions as testing proceeded. A total of six gallons of distilled water were added to the test rig and heated to 100° F. Next, 250 ml of product to be tested were added to the rig solution. Thereafter, 5 grams of calcium carbonate were added to the rig solution and conductivity change was monitored and recorded for one hour. An additional 5 grams of calcium carbonate were added and, again, conductivity changes were monitored for one hour. An increase in conductivity represents the dissolving of calcium carbonate and is therefore representative of the deposit removal capacity of the treatment.

TEST A

An in-service descaler of the type disclosed and claimed in U.S. Pat. No. 4,279,768 was prepared with the following formulation:

| Component | Percent by Weight |
| --- | --- |
| Chelant (tetrasodium ethylene diamine tetraacetic acid), 40% by weight aqueous solution, commercially available | 10.0 |
| Antiprecipitant/dispersant (an anionic organic polyelectrolyte (polyacrylamide) having a molecular weight of about 8000) available commercially under the trade name "Liquid Cyanamer P-35" from American Cyanamid Company, Industrial Chemicals Division of Wayne, NJ) | 0.25 |
| Antiprecipitant (the anionic organic polyelectrolyte (polyacrylamide) having a molecular weight of about 1000) available commercially under the trade name "Liquid Cyanamer P-70" from American Cyanamid Company, Industrial Chemicals Division of Wayne, NJ) | 0.25 |
| Ferrous metal corrosion inhibitor (sodium gluconate) (available commercially) | 1.0 |
| Water | balance. |

With this material in the test rig described above, an increase of 90 micromhos was observed. This increase in conductivity represents scale removal capacity as previously disclosed in the prior patent mentioned.

TEST B

A boiler water treatment was prepared with the following formulation:

| Ingredient | Percent by Weight |
| --- | --- |
| 1-hydroxyethane-1,1-diphosphonic acid (HEDP) (60% solution) | 10% |
| polyacrylate (molecular weight 2000–60000) (50% solution) | 10% |
| sodium lignosulfate | 2% |
| poly (acrylic acid-co-hypophosphite), sodium salt (50% solution) | 2% |
| sodium hydroxide which will normally achieve a boiler pH level of between 10.5 and 12.5 (50% solution) | 15% |
| water | balance. |

With the above formulation in the test rig, an increase in conductivity of 20 micromhos was noted. This increase in conductivity represents scale removal capacity, albeit of a lesser degree than in Test A.

TEST C

A combination of in-service descaler as in Test A and boiler water treatment as in Test B was prepared by having the following formulation:

| Ingredient | Percent by Weight |
| --- | --- |
| 1-hydroxyethane-1,1-diphosphonic acid (HEDP) (60% solution) | 10% |
| polyacrylate (50% solution) (molecular weight 2000–6000) | 10% |
| sodium lignosulfonate | 2% |
| poly (acrylic acid-co-hypophosphite), sodium salt (50% solution) | 2% |
| tetrasodium salt of ethylene diamine tetraacetic acid (EDTA) (40% solution) | 10% |
| sodium gluconate | 1% |
| sodium hydroxide which will normally achieve a boiler pH level of between about 10.5 and 12.5 (50% solution) | 15% |
| water | balance. |

With the above formulation in the test rig, an increase in conductivity of 330 micromhos was noted. This conductivity increase represents a three-fold increase in scale removal capacity over the sum of the Test A and Test B formulations alone. Since none of the ingredients present in the Test C formulation were included at a greater percentage than in the Test A and Test B formulations, the increase in scale removing performance may be attributed to a synergism between the ingredients in Test formulation A and Test formulation B as disclosed in Test formulation C.

In order to employ the formulation of the present invention in an actual working solution, the formulation may be introduced into the boiler water by means of an injector. Typically, injectors are calibrated so as to deliver a predetermined and fixed proportion of the injected material to the make-up water.

In actual operation, the boiler system conditions will be in accordance with American Boiler Manufacturer's Association Standards.

What is claimed is:

1. A chemical treatment to be utilized in steam-producing boiler systems providing for the prevention of scale and deposition and further providing for the in-service removal of scale and deposits present in the systems consisting essentially of a composition having the following formulation:

| Ingredient | Percent by Weight |
| --- | --- |
| Tetrasodium salt of ethylene diamine tetraacetic acid (EDTA) (in 40% aqueous solution) | 10% |
| 1-hydroxyethane-1,1-diphosphonic acid (HEDP) (in a 60% active, aqueous solution) | 10% |
| Polyacrylate (in a 50% active, aqueous solution) with a molecular weight of between 2000–6000 | 10% |
| Poly (acrylic acid-co-hypophosphite) sodium salt (50% solution) with a molecular weight of between 200–1500 | 2% |
| Sodium gluconate | 1% |
| Sodium lignosulfonate | 2% |
| Sodium hydroxide (in a 50% solution) which will normally achieve a boiler pH level of between about 10.5 and 12.5 | 15% |
| Water | balance. |

* * * * *